United States Patent [19]

Fisher, Jr. et al.

[11] Patent Number: 5,754,446
[45] Date of Patent: May 19, 1998

[54] METHOD AND APPARATUS FOR OPTIMIZING PERFORMANCE OF A KAPLAN TURBINE

[75] Inventors: Richard K. Fisher, Jr., Jacobus; Richard A. Johnson; Ronald E. Deitz, both of York, all of Pa.

[73] Assignee: Voith Hydro, Inc., York, Pa.

[21] Appl. No.: 699,653

[22] Filed: Aug. 19, 1996

[51] Int. Cl.[6] .............................. G05B 13/04; G06F 17/00
[52] U.S. Cl. .......................... 364/494; 364/492; 364/495; 364/551.01; 364/578; 364/148; 364/149; 364/152; 415/1; 415/17; 415/33; 415/36; 405/78; 290/43; 290/40 R; 290/52; 290/7; 60/364; 60/398
[58] Field of Search ........................... 364/492–495, 364/148–152, 500, 551.01, 578, 853, 856; 290/43, 40 R, 52, 7, 54; 405/78; 416/17; 60/364, 398; 415/148, 13, 14, 30, 33, 47–50, 118, 1, 17, 36

[56] References Cited

U.S. PATENT DOCUMENTS

| | | |
|---|---|---|
| 4,234,925 | 11/1980 | Kitano et al. . |
| 4,319,320 | 3/1982 | Sato et al. . |
| 4,486,381 | 12/1984 | Hirukawa Koji et al. . |
| 4,490,808 | 12/1984 | Jasmin ..................................... 364/802 |
| 4,674,279 | 6/1987 | Ali et al. ..................................... 60/398 |
| 4,683,718 | 8/1987 | Larsson . |
| 4,770,843 | 9/1988 | Taleyarkhan . |
| 4,794,544 | 12/1988 | Albright et al. . |
| 4,823,018 | 4/1989 | Kuwabara et al. . |
| 4,994,684 | 2/1991 | Lauw et al. . |
| 5,322,412 | 6/1994 | Erlach . |
| 5,346,359 | 9/1994 | Propst ......................................... 415/1 |
| 5,402,332 | 3/1995 | Kopf . |

FOREIGN PATENT DOCUMENTS

| | | |
|---|---|---|
| 0644331A1 | 3/1995 | European Pat. Off. . |
| 935 540 | 11/1955 | Germany . |
| 3601289A | 7/1987 | Germany . |
| 1228445 | 4/1971 | United Kingdom . |

Primary Examiner—Emanuel Todd Voeltz
Assistant Examiner—Tuan Q. Dam
Attorney, Agent, or Firm—Foley & Lardner

[57] ABSTRACT

A method and system for optimizing performance of a Kaplan turbine power generating unit are provided wherein an optimal "N-dimensional" virtual cam is populated with gate and blade positional settings producing maximum power output for a set of N operating parameters. The preferred parameters include head, flow, power generation level, physical situation of the unit, operating state of neighboring units, trash rack loss and a parameter indicative of cavitation (such as relative submersion level). When the system detects a unique set of operating conditions for which optimization is needed, an iterative optimization search is performed for the best gate and blade positional settings, which are then saved in memory (populating the cam matrix) for subsequent use when the same operating conditions are encountered. The optimal matrix divides parameters having ranges into range segments and treats other parameters as having discrete states. The optimization search is preferably performed while maintaining flow constant, and a flow characteristic search is performed to determine candidate gate and blade settings resulting in constant flow.

29 Claims, 8 Drawing Sheets

METHOD AND APPARATUS FOR OPTIMIZING PERFORMANCE OF A KAPLAN TURBINE

BACKGROUND OF THE INVENTION

The present invention relates generally to operation of a reaction-type power generating turbine. More particularly, the invention relates to optimization of the performance of a Kaplan turbine by proper adjustment of runner blade pitch and wicket gate angle as a function of a number of operating parameters susceptible of affecting turbine performance.

Several different turbine configurations are generally known in the art of hydroelectric power generation, including fixed and adjustable blade designs, and reaction and impulse types. One known reaction type turbine, commonly referred to as the Kaplan turbine, includes both an adjustable blade propeller runner and movable wicket gates. The wicket gates, typically rotatable about axes parallel to or inclined with respect to the turbine shaft, permit regulation of flow across the runner, while adjustments of the runner blades allow for regulation of the turbine efficiency over a wide range of power output. Proper adjustments of both wicket gate position and blade tilt or angle can thus afford considerable control of the turbine performance and may be coordinated to maintain peak performance as a function of various operating parameters, typically head, flow and power generation level. However, the proper settings for gate position and blade tilt must be determined for the desired operating parameters to allow the system controller to make necessary adjustments as the parameters change in real time.

Various techniques have been proposed for optimizing performance of Kaplan turbines. Known systems typically employ computerized or virtual cam surfaces relating gate position and blade tilt to head, flow and power generation level (typically referred to as a three dimensional or 3D CAM). Such systems are capable, in real time, of monitoring desired or actual levels of head, flow and power, and automatically commanding adjustment of gate position and blade tilt to maintain modeled or empirically estimated peak turbine efficiency.

Because model performance data may differ substantially from actual characteristics in a large-scale installation, techniques have been proposed for collecting actual turbine performance data to supersede or supplement model data. For example, in one such technique, a power generation set point is determined and is subsequently maintained as the wicket gates and runner blades are moved through a series of positions. Efficiency of the turbine is estimated and, based upon the results of the battery of sampled position combinations, presumed maximum efficiency gate and blade position settings for the operating head and flow rate are saved for future use in the 3D CAM. In another technique, an operating parameter, such as pressure or bearing load is monitored and used as an indicator of a optimal positions of the wicket gates and runner blades.

While such techniques are helpful in determining optimal settings related to actual operation of installed turbine units, they are not without drawbacks. For example, a number of factors other than head, flow and power generation level may often substantially affect turbine performance. Such factors include the position of a particular turbine unit in a power generating system (e.g. its position across a stream or near a bank), the state of operation of neighboring turbine units, inflow and outflow profiles in the head and tailwaters, trash rack losses and so forth. Known methods of generating optimal gate and blade settings for incorporation in a virtual 3D CAM generally either ignore such factors, or assume that their influence on turbine performance will be adequately compensated for in the head and flow parameters. In addition, known optimization methods typically do not permit identification of desired gate and blade positional settings based on constant flow conditions. Moreover, certain empirical optimization techniques used to generate the virtual 3D CAM data, sometimes referred to as index measurements, can be expensive and time consuming to execute. For this reason, in power generating facilities having multiple turbine units, index tests are typically run for a first installed turbine unit to generate the 3D CAM and the same information is then used for subsequently installed turbine units in the facility, again ignoring unit-to-unit differences and dynamic characteristics of the individual units.

There is a need, therefore, for a technique for optimizing performance of a Kaplan turbine that permits determination of optimal settings of gate position and runner blade tilt in a straightforward manner for a wide range of operating parameters capable of affecting turbine performance. In particular, there is a need for a system for determining such settings based upon flow, head, power output level, operating state of neighboring units, turbine unit situation, trash rack losses and the like. The system should be capable of identifying the optimal settings with a minimum of perturbation to the normal operation of the power generation facility, and based upon constant flow conditions monitored and controlled during the optimal setting search routine. Moreover, there is a need for a system for determining optimal settings for a Kaplan turbine based upon constant flow conditions as identified for a particular set of operating conditions for which the optimal settings are sought, thereby accounting for various parameters of the individual turbine unit without the need to run separate index tests for each set of conditions.

SUMMARY OF THE INVENTION

The present invention features a novel technique for controlling a Kaplan turbine designed to respond to these needs. The technique creates a virtual "N-dimensional" cam defined through series of optimal setting matricies identifying values of desired gate and blade positions. The cam accounts for key operating parameters such as head, flow and power production level, and can be expanded to account for the influence of a large number of other parameters susceptible of affecting turbine performance, including parameters relating to the situation of a turbine unit in a power generation facility, the operating state of neighboring units, trash rack losses, cavitation and the like. The matricies defining the virtual cam are preferably populated with initial settings, such as from model data or from past performance or optimization of the turbine unit, and are repopulated and completed as updated or new combinations of operating parameters are encountered during operation of the turbine. A particularly useful feature of the technique is the ability to determine optimal settings based upon constant flow conditions as identified during a blade and gate flow characteristic determining sequence prior to an optimization search directed to the particular parameter combination under examination.

Thus, the invention provides a method for optimizing performance of a Kaplan turbine power generating unit of the type including wicket gates movable to desired positions and runner blades movable to desired tilt positions, the runner blades being coupled through a drive shaft to an electrical power generator. In accordance with one aspect of the method, a set of operating parameter levels is monitored including desired power generation level, flow rate through the unit, head across the unit and at least one other operating parameter capable of affecting efficiency of the turbine unit. The monitored levels are compared to reference levels of the same parameters and, based upon a predetermined relationship between the reference levels and the monitored levels, it is determined whether an optimization search should be performed for gate and blade position settings for the set of operating parameter levels. When desired, the search is then performed, identifying optimal gate and blade positions for the set of operating parameter levels, which are subsequently stored in a memory circuit.

In accordance with another aspect of the method, monitored levels of a set of operating parameters, including desired power generation level, flow rate through the unit, head across the unit and at least one other operating parameter capable of affecting efficiency of the turbine unit, are compared to reference levels of the same parameters to identify a location of the set of operating parameters in an N-dimensional optimal virtual cam matrix, where N is the number of operating parameters in the set of operating parameters. Locations in the matrix identify desired gate and blade positions for the set of operating parameters. The gates and blades are then placed and maintained in positions identified by the location of the set of operating parameters in the matrix.

The invention also provides a method for optimizing performance of a Kaplan turbine in which a set of operating parameter levels is monitored, including at least desired power generation level, flow rate through the unit, head across the unit. The monitored levels are compared to reference levels of the same parameters and, based upon a predetermined relationship between the reference levels and the monitored levels, it is determined whether an optimization search should be performed for gate and blade position settings for the set of operating parameter levels. When the search is to be performed, a flow characteristic search is performed to identify gate and blade positions resulting in a substantially constant flow rate through the unit and the optimization search is then performed to identify optimal gate and blade positions for the set of operating parameter levels, while maintaining the flow rate through the unit substantially constant. The optimal gate and blade positions are then stored for future use.

In accordance with another aspect of the invention, a system is provided for optimizing performance of a Kaplan turbine power generating installation including wicket gates movable to desired positions and runner blades movable to desired tilt positions, the runner blades being coupled through a drive shaft to an electrical power generator. The system includes sensors disposed in the installation for detecting a set of operating parameters including power generation level, flow rate through the unit, head across the unit and at least one other operating parameter capable of affecting efficiency of the turbine unit, the sensors generating sensed parameter signals representative of the operating parameters. A memory circuit is provided for storing reference levels of the operating parameters. A comparison circuit is coupled to the sensors and to the memory circuit, and compares the sensed parameter signals to the reference levels. An optimization circuit is coupled to the comparison circuit and to the memory circuit, and executes an optimization search based upon a predetermined relationship between the sensed parameter signals and the reference levels to identify optimal gate and blade positions for the sensed operating parameters. The optimization circuit is configured to store the optimal gate and blade positions in the memory circuit.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
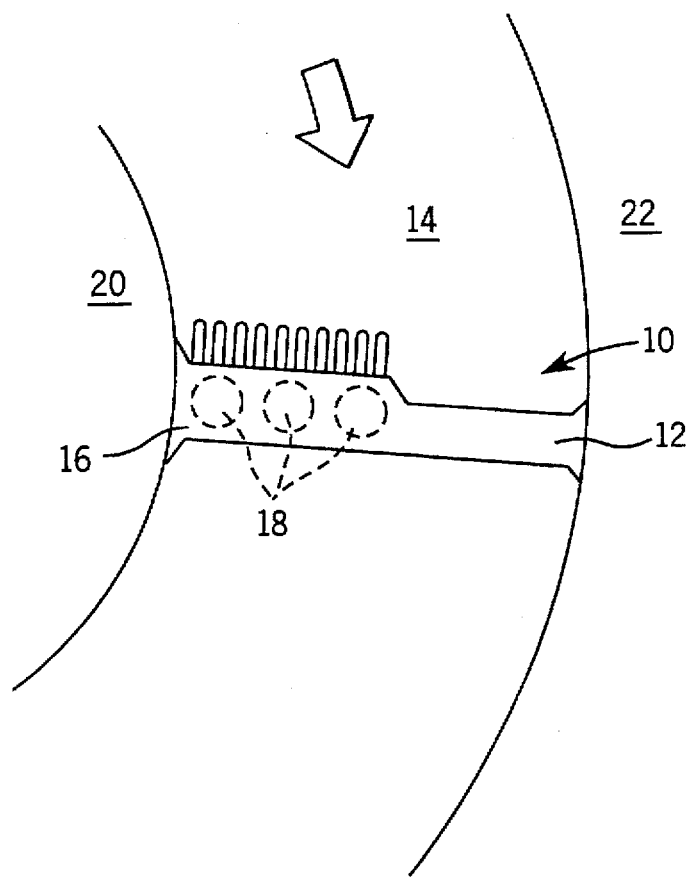
FIG. 1 is an exemplary perspective view of a turbine power generating facility including several turbine units across a section of a stream.

Turning now to the drawings and referring to FIG. 1, a hydroelectric power generating installation 10 is illustrated generally, including a dam 12 spanning a stream 14, and a power generating facility 16. In the exemplary installation illustrated, facility 16 includes a series of three Kaplan turbine generating units, designated generally by the reference numeral 18. As will be understood by those skilled in the art, facility 16 may include more or fewer generating units 18, and such units may be situated adjacent to one or both banks 20, 22 of stream 14, or at various locations between the banks. In operation, facility 16 generates electrical power by permitting water to flow through turbine units 18, and outputs the generated power on a power distribution grid (not represented).

Figure 2:
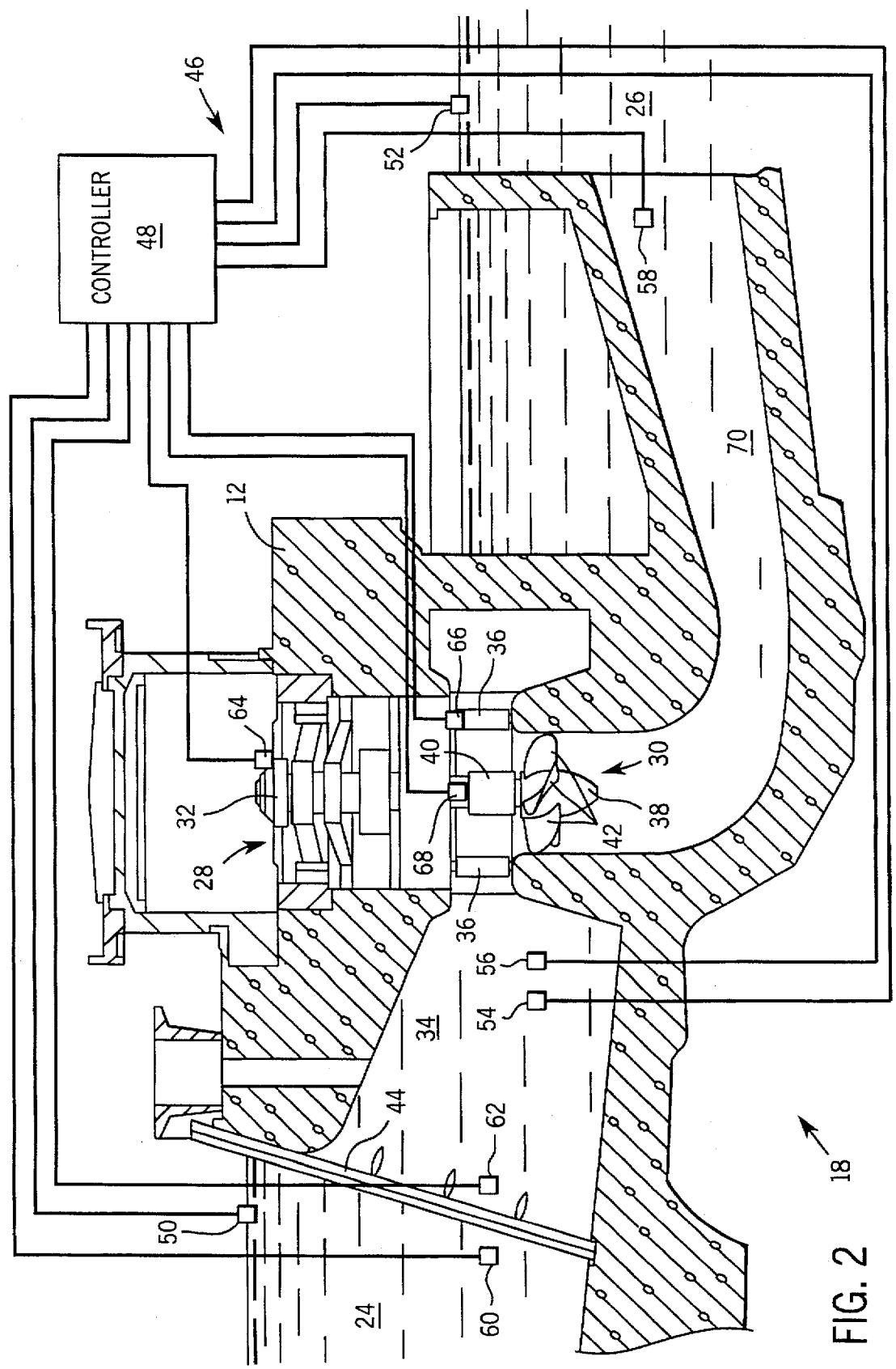
FIG. 2 is a diagrammatical representation of a turbine installation illustrating exemplary instrumentation for generating optimal N-dimensional cam data in accordance with the inventive technique.

Each turbine unit 18 may be of generally known design, preferably including a vertical Kaplan turbine as illustrated diagrammatically in FIG. 2, for generating electrical power as water is allowed to flow through dam 12 from a headwater reservoir 24 of stream 14 to a tailwater side 26. It should be noted, however, that units 18 may include horizontal turbines or may be constructed as Kaplan type pump turbines where appropriate. Thus, unit 18 includes a turbine support superstructure 28 built within dam 12. Superstructure 28 provides axial and radial support for a Kaplan turbine 30 and electrical generator 32. Turbine 30 is positioned within the flow path of stream 14, downstream of a upstream conduit 34 and movable wicket gates 36. Turbine 30 includes a runner 38 supported on a vertical shaft 40 and having a plurality of movable blades 42 disposed around its periphery for driving shaft 40 and generator 32 in rotation as water flows through dam 12 from headwater 24 to tailwater 26. Unit 18 also includes a trash rack 44 upstream of upstream conduit 34, typically comprising parallel, spaced-apart bars, for preventing large objects and debris from fouling or damaging turbine 30.

In the preferred embodiment illustrated in FIG. 2, unit 18 includes a control system, designated generally by the reference numeral 46, including number of sensors 50, 52, 54, 56, 58, 60, 62 and 64 and actuators 66 and 68 coupled to a controller 48 by appropriate data links. For the purposes of optimizing performance of unit 18, the sensors of control system 46 preferably permit detection of a set of operating parameters, including differential head from headwater 24 to tailwater 26, power generation level, flow through unit 18, cavitation, and trash rack head loss. While a number of alternative method are known in the art for directly or indirectly measuring these parameters, preferred sensing devices include the following. Stilling well-type transducers 50 and 52 measure the relative elevation or height of headwater and tailwater 24 and 26, respectively. Such measurements are used to determine the drop in head across dam 12 and for determining the submersion factor (a) of the turbine as an indication of the risk of cavitation within turbine 30. The submersion level is generally determined as a function of the difference between the tailwater elevation and a reference elevation for turbine 30 in a manner well known in the art. Sensor 54, positioned, where feasible within upstream conduit 34, is a pressure transducer providing a signal proportional to head upstream of turbine 30, accounting for head losses between headwater 24 and gates 36. Where unit 18 has a relatively short upstream conduit 34, sensor 54 may be situated near its entry. Reference numeral 56 represents a sensor assembly positioned within upstream conduit 34 for generating a signal indicative of flow through unit 18. In the preferred embodiment, flow is determined by the well known Winter-Kennedy method, although alternative methods could be substituted, including the Peck method. Sensor 58, provided in the draft tube 70 of unit 18, is a pressure transducer similar to sensor 54 generating a pressure measurement signal and isolating losses from turbine 30 to tailwater 26. Sensors 60 and 62 are pressure transducers generating pressure measurements on either side of trash rack 44, and providing an indication of head loss across trash rack 44. Alternatively, trash rack losses could be indicated by measurements of headwater level (e.g. from sensor 50) and inlet head (e.g. from sensor 54). Finally, reference numeral 64 represents a power monitor providing a continuous signal indicative of the level of power being generated by unit 18.

In addition to the sensors described above, control system 46 is provided with actuator assemblies 66 and 68 for orienting gates 36 and blades 42 at desired positions. Actuator assemblies 66 and 68 may be of any suitable type known in the art, such as assemblies including hydraulic cylinders or motors coupled to mechanical linkages for effectuating the desired movement of the gates and blades and for holding the gates and blades in the desired positions against the force of impinging flow through unit 18. Moreover, actuator assemblies 66 and 68 also include sensors, such as potentiometers, linear variable differential transformers or the like, for providing feedback signals indicative of the actual positions of gates 36 and blades 42.

Signals from the various sensors outlined above are applied to controller 48, which also serves to generate control signals for commanding actuator assemblies 66 and 68 to position gates 36 and blades 42 in desired orientations. In the presently preferred embodiment, controller 48 includes an appropriately configured programmable logic controller executing a cyclic control routine stored in resident memory. Moreover, controller 48 is preferably also linked to other turbine units 18 within facility 16. Thus, where the other units 18 within facility 16 are comparably instrumented, controller 48 receives signals indicative of the operating parameters of all units 18 in facility 16, and controls operation of all gates and blades in the various units. It should be noted that, by virtue of its ability to share information indicative of the operating state of neighboring units 18, controller 48 may influence operation of some or all of units 18 based in part on the operating state of neighboring units, as described more fully below.

Figure 3:
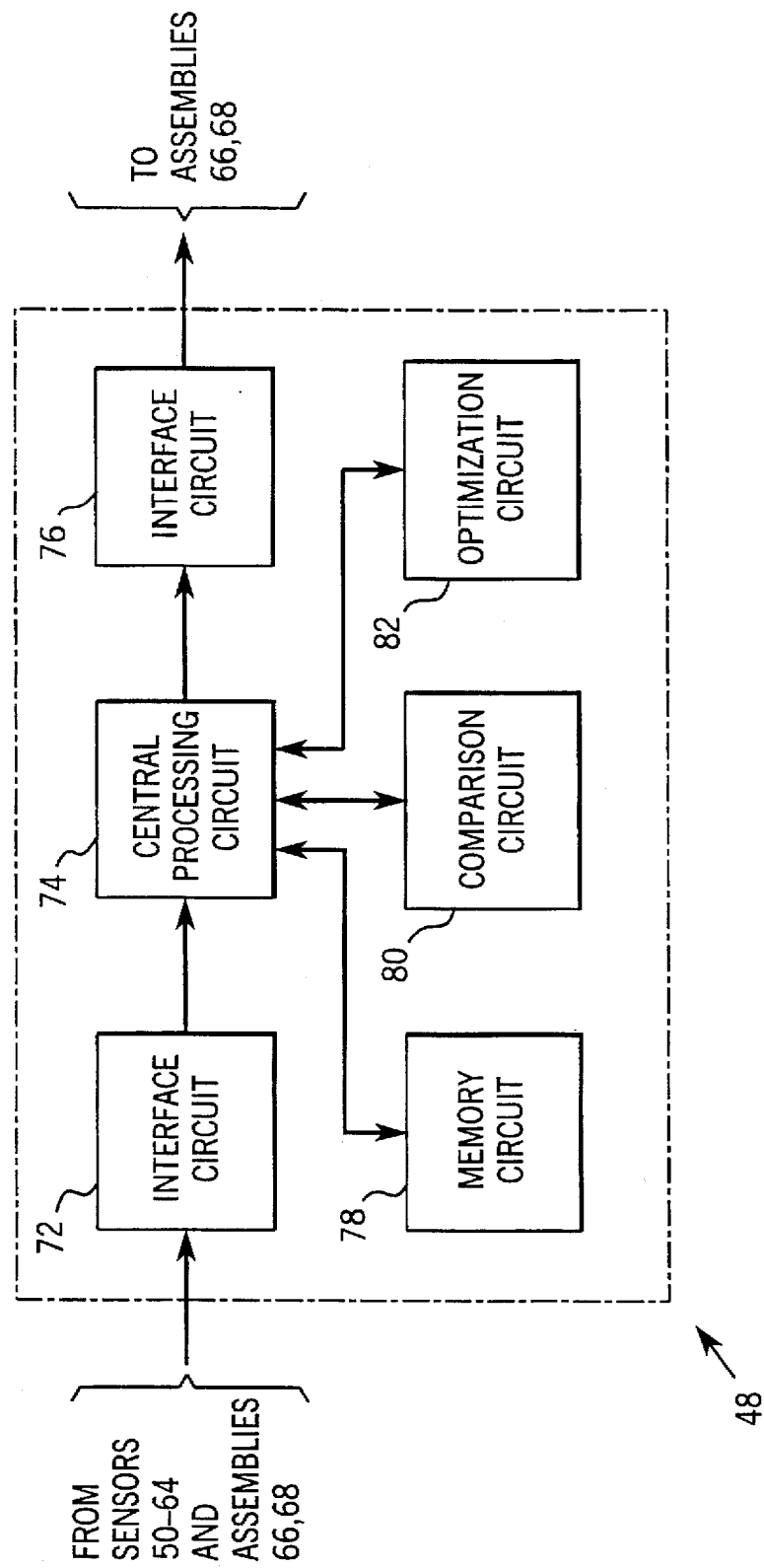
FIG. 3 is a block diagram of certain of the functional circuits in the control system illustrated in FIG. 2 for determining the optimal cam data.

FIG. 3 is a general block diagram of certain functional circuits included in controller 48 when programmed to execute an optimization technique as described below. Controller 48 includes an interface circuit 72, a central processing circuit 74, an interface circuit 76, a memory circuit 78, a comparison circuit 80 and an optimization circuit 82. Interface circuit 72, which typically includes appropriate multiplexing, analog-to-digital converting and signal conditioning circuitry receives operating parameter signals from sensors 50-64 and feedback signals from actuator assemblies 66 and 68, and applies these signals to central processing circuit 74. Similarly, interface circuit 76, which typically includes signal conditioning and valve driver circuits for operating actuator assemblies 66 and 68, receives control signals from central processing circuit 74 and commands corresponding servo movement of gates 36 and blades 42. Central processing circuit 74 is also linked to memory circuit 78, comparison circuit 80 and optimization circuit 82. In operation, central processing circuit 74 executes a cyclical control routine stored within memory circuit 78 for controlling operation of facility 16. As described more fully below, during certain phases of the control routine, central processing circuit 74 calls upon comparison circuit 80 to perform comparisons of the sensed operating parameters with a set of reference values for the parameters stored in memory circuit 78. These comparisons enable central processing circuit 74 to locate the set of current operating parameters in a multi-dimensional matrix (i.e. the N-dimensional virtual cam) defined by the reference values. When the comparison indicates that optimal gate and blade position settings for the set of operating parameters needs to be identified, central processing circuit 74 calls upon optimization circuit 82 to perform a search of candidate gate and blade positions as summarized below. Following the search, the optimal gate and blade positions are stored in memory circuit 78 for future use when the same set of operating parameter values is encountered.

As will be appreciated by those skilled in the art, the functional circuitry represented in FIG. 3 may be defined by standard input/output circuitry, memory circuitry and programming code in a standard programmable logic controller, personal computer, computer workstation or the like. For example, in the presently preferred embodiment, central processing circuit 74, in the form of a programmable logic controller dedicated to facility 16, is provided with resident memory for executing a main control routine. Comparison circuit 80 and optimization circuit 82 are configured in a portable computer system that can be selectively linked to the programmable logic controller to execute optimization of the detected set of operating parameters when desired. Alternatively, comparison and optimization circuitry may be configured in a single controller with central processing circuit 74, or may be entirely remote from facility 16 and selectively linked to central processing circuit 74 by modem or other telecommunication device.

Figure 4A:
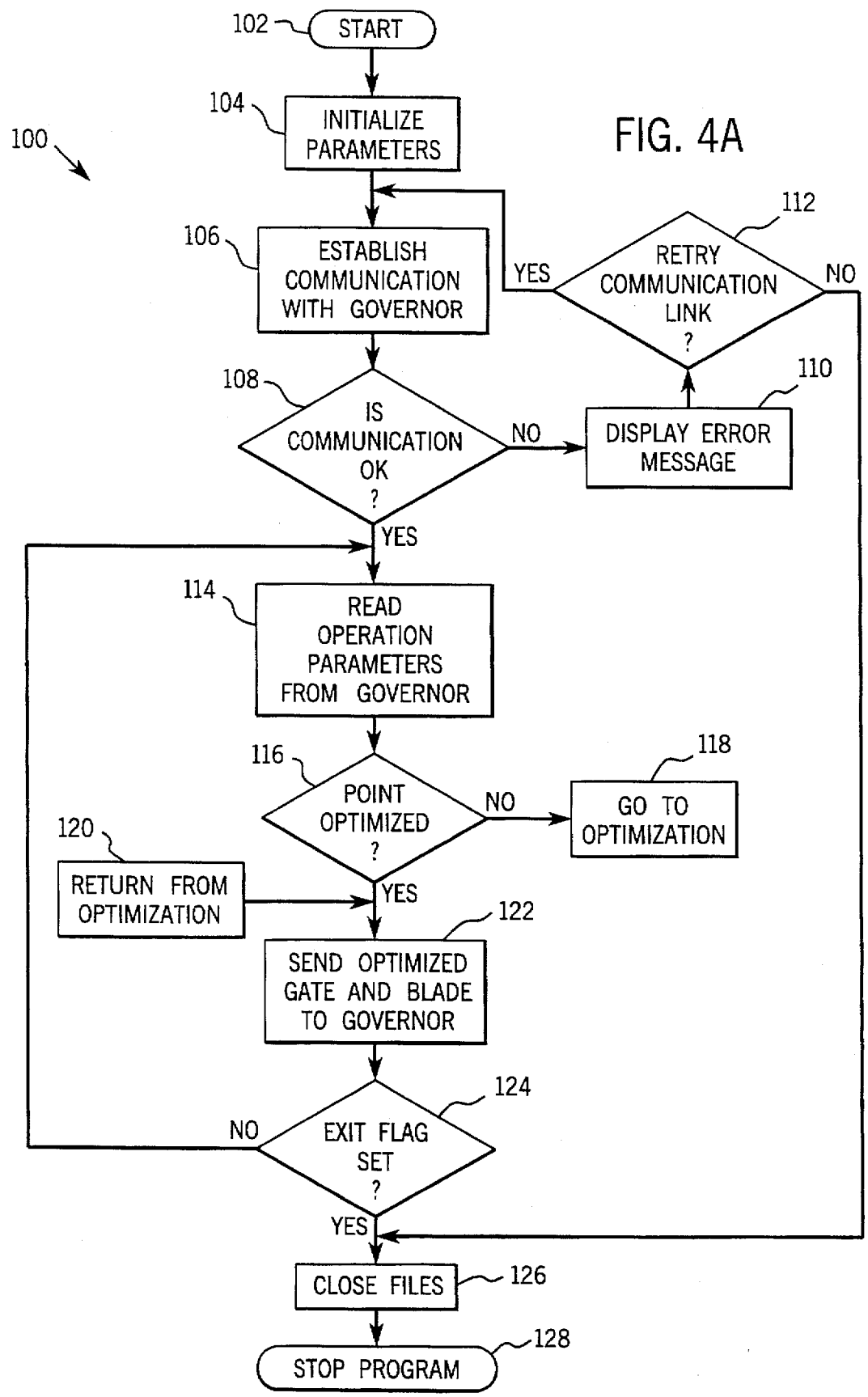
FIGS. 4A–4D are flow charts illustrating exemplary control logic for controlling the turbine unit of FIG. 1 and for generating optimal cam data during its operation.

FIGS. 4A-D illustrate exemplary control logic for performing an optimization search for a set of detected operating parameters in accordance with certain aspects of the invention. FIG. 4A shows certain steps in the main control routine 100 executed by central processing circuit 74. It should be noted that details regarding the main operating routine have not been represented here for the sake of clarity and do not, per se, form a part of the present optimization technique. Step 102 represents the start of the cyclic control routine. At step 104, central processing circuit 74 initializes all monitored parameters, including head, flow, power output level, tailwater level (for calculation of the submersion factor σ), trash rack head loss, and any other operating parameters needed to control operation of unit 18. These parameters will typically be sensed and stored as inputs for a computerized governor module or routine executed by circuit 74 in a manner generally known in the art. At step 106, optimization circuit 82 establishes communication with the governor module being executed by circuit 74, and at step 108 verifies that the communication link is operational. If a problem is detected in the communication link, at step 110 an error message is displayed, such as on an operator monitor (not shown) and a decision is made whether to retry the communication link at step 112. Steps 106 through 112 are particularly suited to a hardware configuration in which optimization circuit 82 is programmed in a portable or remote computer temporarily linked to central processing circuit 74.

When the communication link is successfully established, circuit 74 reads current values from the governor module at step 114 for all operating parameters for which performance of unit 18 is to be optimized. In the preferred embodiment, optimization is based upon a number of operating parameters in addition to the conventional dimensions of head, flow and power generation level. These include the relative submersion factor σ (as an indicator or the risk of cavitation), trash rack loss, neighboring unit operating state and the relative situation of the particular unit in facility 16. These parameters are generally susceptible of influencing performance of unit 18 as follows. Relative submersion level provides an indication of the risk of cavitation within unit 18, typically reduced by increasing the submersion of turbine with respect to tailwater 26. As will be appreciated by those skilled in the art, in addition to the tailwater level, the barometric pressure and water temperature are typically also sensed to permit calculation of the parameter σ in a manner known in the art. Alternatively, an indication of cavitation can be provided by an acoustic sensor capable of detecting pulsations within frequency bands characteristic of cavitation. Trash rack losses may adversely affect performance by reducing the headwater pressure head. Moreover, the operating state of neighboring units may significantly alter performance of the turbine units, such as by altering flow patterns into the upstream conduit and out of the draft tubes, particularly where a neighboring unit is entirely or substantially closed to flow. In the presently preferred embodiment, the immediate neighboring unit operating state is noted for each unit as either "operating" or "not operating", although depending upon the particular plant being optimized, this information may include operating state of non-adjacent units and may note additional operational levels, such as by dividing the neighboring unit operation into 5 steps of from 0 to 100% power generation level. Finally, the particular situation of the unit is accounted for in the optimization system by generating a unique set of optimal matrices for each unit in facility 16. The situation of the individual unit 18 in facility 16 also may have a significant impact on flow patterns into and out of the unit.

After noting the current state of the monitored set of operating parameters, comparison circuit 80 compares the set of operating parameters to reference levels for the parameters stored in memory circuit 78. In the presently preferred embodiment, anticipated ranges for head, flow, power generation level, submersion level and trash rack head loss are divided into a fixed number of reference levels, such as ten, while neighboring unit operating state is categorized into discrete classifications, such as left on/right on, left on/right off, left off/right on and left off/right off, to form an N-dimensional matrix, where N is the number of operating parameters considered. In addition, as indicated above, a similar matrix is developed for each unit 18 in facility 16, effectively adding an additional layer or dimension to the overall optimization system virtual cam. Thus, in the embodiment described above, beyond the conventional parameters of head, flow and power generation level, optimization matrices are developed including at least 4 additional dimensions or operating parameters, namely, submersion level σ, trash rack loss, neighboring unit operating state and physical situation of the unit in the overall facility. For each combination or set of operating parameters, desired gate and blade positions are stored in memory circuit 78. At step 116, comparison circuit 80 accesses the particular matrix location corresponding to the current set of operating parameters and determines whether optimal gate and blade positional settings have been determined. It should be noted that, while optimal settings may not have been determined for the particular set of parameters being evaluated, most or all of the optimal matrix locations will be populated prior to installation of the optimization portion of the control routine from model data, past performance data, index testing data or the like.

Figure 4B:
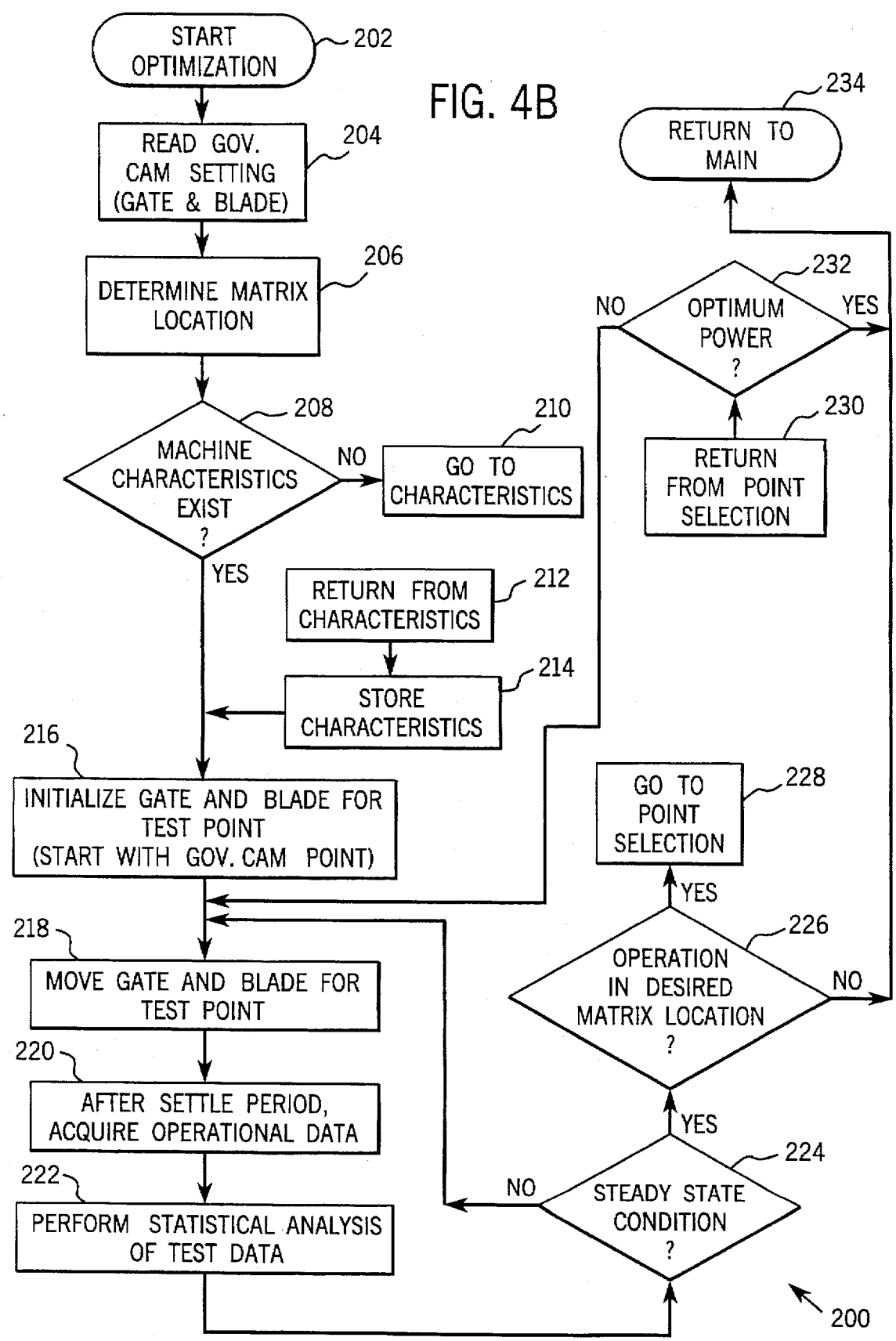

When comparison circuit 80 determines that the settings associated with the current set of operating parameters have not been determined by an optimization search (or are in need of updating), circuit 74 progresses to block 118, where the optimization search illustrated in FIG. 4B is executed. In the presently preferred embodiment, the current levels of each operating parameter must be clearly within the bounds of a particular matrix block before entry into the optimization search routine will be permitted at step 118. In particular, for parameters divided into ranges, the current level of corresponding sensed parameters must be within the middle third of the range attributed to a matrix block. For example, for the flow rate parameter, if the current level of flow through unit 18 is found to be between the matrix levels of 60 and 70 cubic meters per second, entry into the optimization search routine is permitted only if the actual flow rate is between 63.3 and 66.6 cubic meters per second. This requirement ensures that optimal settings are identified that clearly correspond to the matrix location to be populated.

Step 120 in FIG. 4A represents the return from the optimization routine of FIG. 4B. At step 122, the optimal settings for gate and blade positions are transmitted to the main governor module being executed by central processing circuit 74, which generates control signals for appropriately positioning actuator assemblies 66 and 68. It should be noted that in the presently preferred embodiment, optimization circuit 82 actually determines the difference between the optimal settings for the gate and blade positions and those settings currently stored in memory circuit 78 for the set of operating parameters under consideration, and saves these differences as corrections to the existing settings. Alternatively, circuit 82 could derive the actual value of the optimal position settings and save this value in the corresponding memory location in place of the existing settings. At step 124, circuit 74 checks whether an exit flag has been set, such as by operator intervention, automatic interrupt or the like, and if not, returns to step 114 to continue to cycle through its control routine. If an exit flag is detected at step 124, circuit 74 proceeds to steps 126 and 128, closing all open program files and exiting the control program.

Figure 4C:
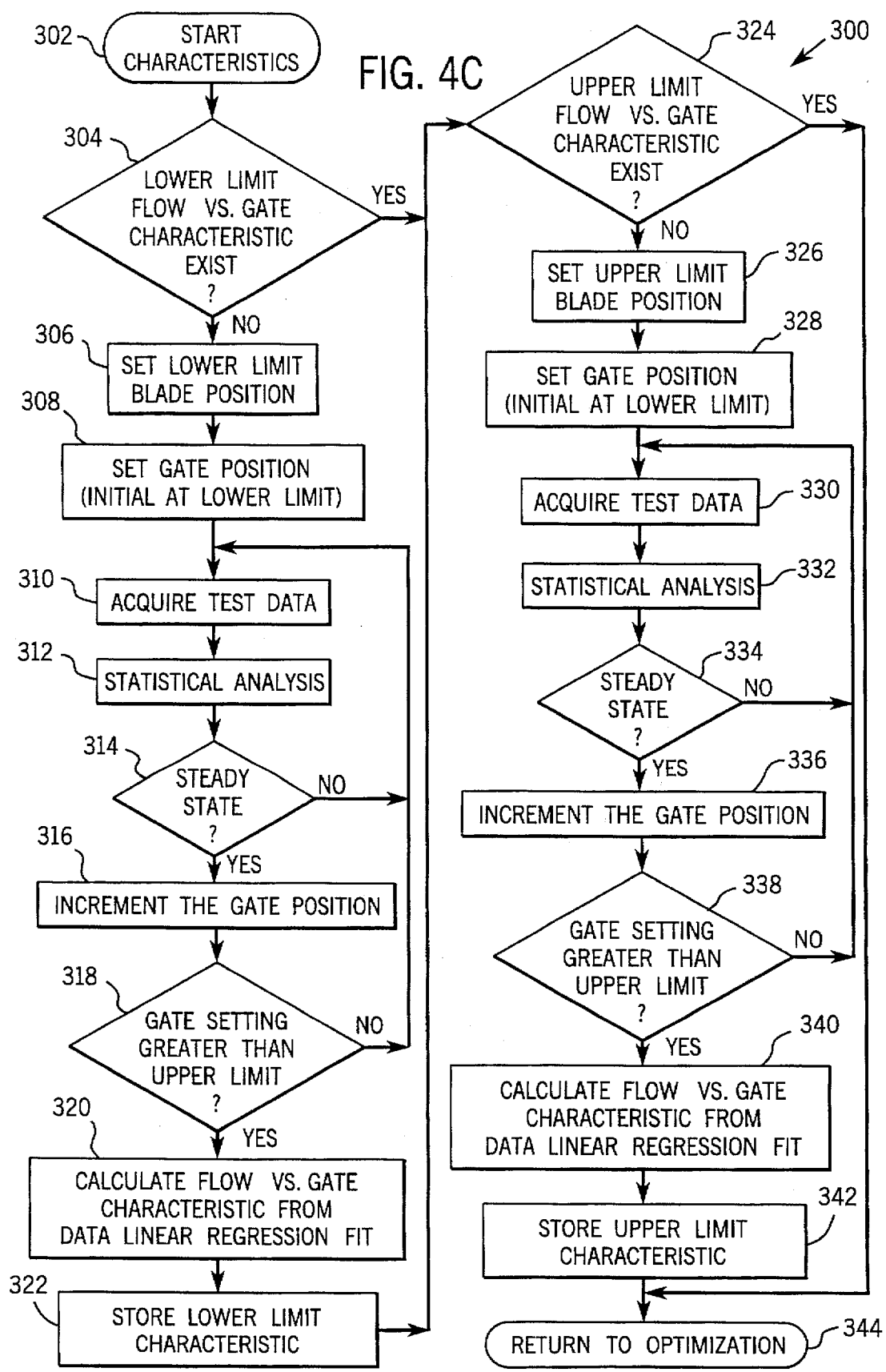

Exemplary control logic for the optimization search routine 200 is illustrated in FIG. 4B. At step 202, circuit 82 enters the routine from step 118 of FIG. 4A and reads the current gate and blade settings populating the optimal matrix location for the current set of operating parameters, as indicated at step 204. At step 206, the matrix location is again verified. At step 208, circuit 82 determines whether constant flow characteristic data is saved in memory circuit 78 for the current set of operating parameters. Because in the preferred embodiment, location of optimal gate and blade positional settings is determined while maintaining flow substantially constant, it is advantageous to determine combinations of actual gate and blade settings that provide constant flow for the current operating conditions prior to executing the optimization search sequence. If such data is not available in memory, circuit 82 proceeds to step 210 and performs a constant flow characteristic search routine as illustrated in FIG. 4C and described below. Step 212 represents the return from the constant flow characteristic search routine. At step 214, the constant flow characteristic data are stored in memory circuit 78 for future reference.

At step 216 the wicket gates and runner blades are moved to initial positions stored in the optimal matrix as a starting point for the optimization search. At step 218, the gates and blades are moved to new candidate positions (but are held stationary in the initial pass through step 218). Although the optimization search progresses through gate and blade positions resulting in substantially constant flow, movement of the gates and blades in steps 216 and 218 result in some perturbation in operating parameters, particularly power generation level. Thus, at step 220, the routine waits for a settling period during which monitored operating parameters are allowed to calm to steady state levels. Although this settling period will vary for particular installations, 2 to 5 minutes are typically sufficient for the monitored parameters to reach steady state levels. As will be appreciated by those skilled in the art, this settling period could be reduced or essentially eliminated by properly anticipating (e.g. modelling) transient behavior of the installation. Monitored data is then collected and at step 222, statistical analyses are performed on the test data, including mean and standard deviation calculations to determine whether fluctuations in parameters, particularly head, flow and power generation level have settled to within acceptable bands. At step 224 results of the statistical analyses are compared with reference values considered to represent steady state operation. If it is determined that the system has not reached steady state operation, circuit 82 returns to step 218, but maintains the gates and blades at their current positions for an additional settling period.

Once it is determined at step 224 that unit 18 has reached steady state operation, the current levels of the set of operating parameters is checked to ensure that they still correspond to the matrix location to be optimized. Although a relatively narrow band is preferred for entry into the optimization sequence, as summarized above, considerably less stringent ranges are imposed for continuation of the optimization search at step 226. For example, in the presently preferred embodiment, although the parameters divided into anticipated ranges must lie within the middle third of the attributed range for the particular matrix block for entry into the optimization search, the search sequence will terminate at step 226 only if the same parameters no longer fall within the matrix block (i.e. cross over a boundary between matrix blocks).

So long as each of the operational parameters remains within the ranges for the point currently being optimized, the search progresses from step 226 to step 228. At step 228, circuit 82 proceeds to a point selection routine for determining whether the search should continue and, in the affirmative, determining the next candidate gate and blade settings. The point selection process will be described more fully with reference to FIG. 4D. Step 230 of FIG. 4B represents the return from the point selection routine. At step 232, optimization circuit 82 determines whether an "optimum power" flag has been set in the point selection routine (see step 434 described below), indicating that the optimum (i.e. peak) power output level has been produced for the set of operating parameters under examination and that the gate and blade settings resulting in the optimum power output level should be saved as the optimal settings in the matrix or cam location. From this point, circuit 82 exits the optimization search at step 234, returning to step 120 of FIG. 4A. If the flag is not detected at step 232, circuit 82 proceeds to step 218 to continue testing other candidate gate and blade settings.

Figure 5:
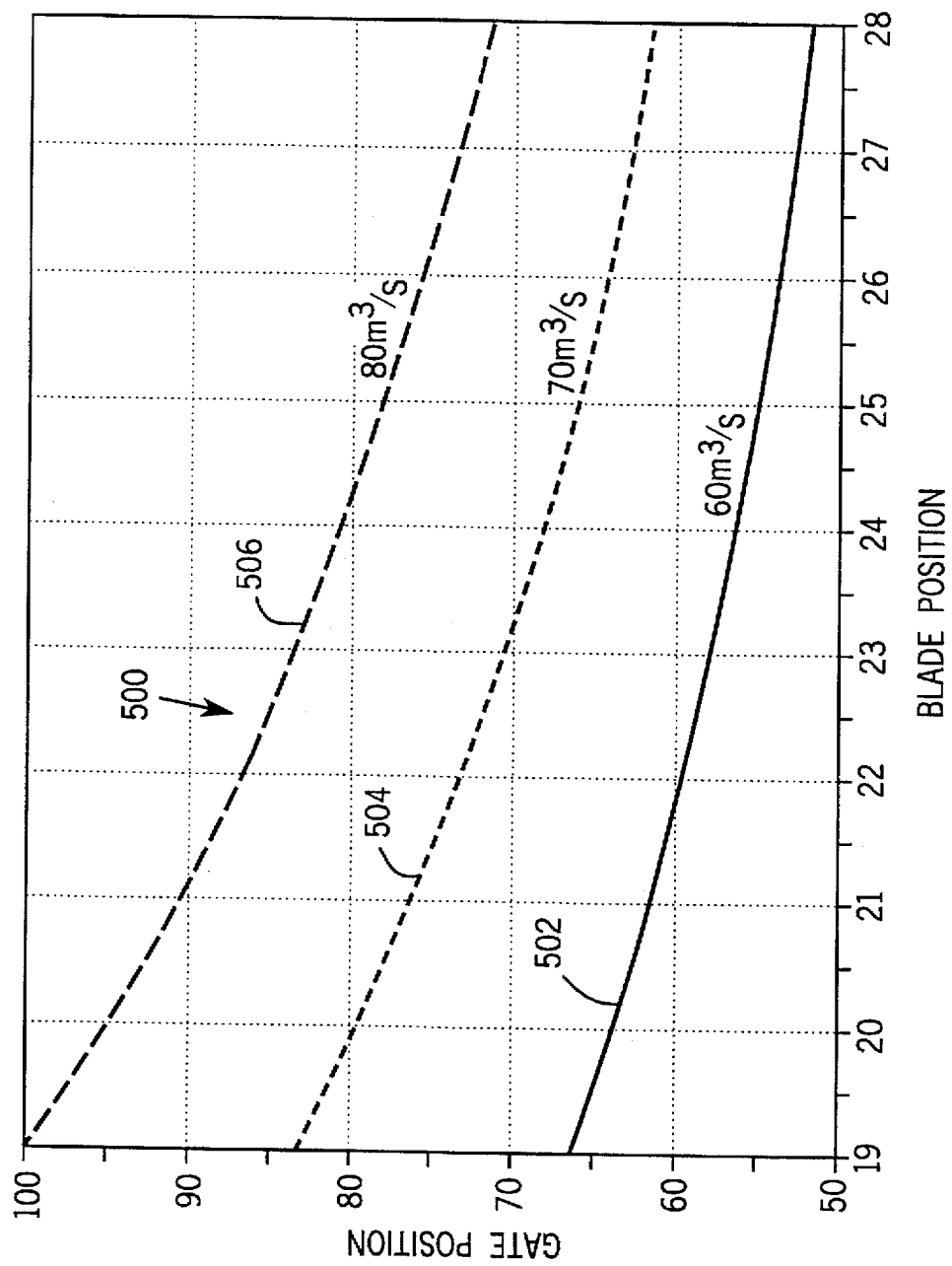
FIG. 5 is a graphical representation of various candidate gate positions related to various candidate blade tilt settings for maintaining constant flow during an optimal setting search sequence as illustrated in FIG. 3.

To permit the optimization search described above to proceed through candidate gate and blade settings while maintaining flow through unit 18 substantially constant, circuit 82 preferably executes a flow characteristic search routine as illustrated in FIG. 4C. The search routine generally sets the runner blades at lower and upper limit positions (i.e. maximum and minimum allowable tilt) and proceeds through a series of gate positions for each blade setting to determine the interdependent flow characteristics of the gate and blade positions for the set of operating conditions under examination. The resulting data can then be used to identify constant flow characteristics, as shown in the curves illustrated in FIG. 5, as a function of gate and blade positions. More detailed background on the procedure used to generate the constant flow curves is provided in U.S. Pat. No. 5,402,332, issued to Kopf on Mar. 28, 1995 and hereby incorporated into the present disclosure by reference. The data forming the basis for the resulting family of curves, indicated generally by the reference numeral 500 in FIG. 5, provides lines along which circuit 82 identifies candidate gate and blade settings for the flow rate parameter of the optimal matrix block under investigation. For example, if the virtual cam block calls for a flow rate of 60 cubic meters per second through unit 18, circuit 82 will identify candidate settings from curve 502. For flow rates of 70 or 80 cubic meters per second, curves 504 or 506, respectively, would serve as the guide for candidate positions. It should be understood that the flow rate under consideration need not correspond to any particular preset level, but will ultimately be fixed by identification of the flow rate ranges for which the virtual cam or optimal matrix is to be established.

It should be noted that the present method provides data from which appropriate blade tilt and gate positions can be determined that maintain substantially constant flow through unit 18. Thus, rather than the model data used as a basis for these calculations in the technique of U.S. Pat. No. 5,402,332 mentioned above, the present technique utilizes the same relationships but derives the desired blade and gate positions from actual measured data. In general, the method effectively determines the effect of blade tilt on flow rate (i.e. the partial derivative of flow with respect to blade tilt angle) and the effect of gate position on flow rate (i.e. the partial derivative of flow with respect to gate position) to anticipate or determine the appropriate corresponding blade and gate positions required to maintain the desired rate of flow. Moreover, it should be noted that it is not essential for this process to determine the absolute flow rate. Rather, because flow rate is maintained substantially unchanged, it is only necessary to monitor a parameter proportional to (or more generally, indicative of) flow rate (e.g. differential pressure used in the Winter-Kennedy method for determining flow rate) and to determine how the parameter changes with changes in gate and blade positions. Changes in flow rate may then be inferred from changes in the related parameter. For the present purposes, then, where references are made to constant flow characteristic data, this is intended to refer to parameter data, such as changes in differential pressure, from which the effects of changes in gate and blade positions on flow rate can be derived as set forth in U.S. Pat. No. 5,402,332. Subsequently, by performing the foregoing optimization search while maintaining flow substantially constant, the maximum efficiently of the turbine unit may be determined with reference to power generation level without the need to derive an indication of the actual efficiency of the unit.

As indicated in FIG. 4C, the flow characteristic search 300 begins at step 302. At step 304, circuit 82 examines whether the lower blade position versus gate flow characteristics have been previously determined and stored in memory circuit 78. If so, the search proceeds to step 324. If not, at step 306, the blade position is set to its lower limit. With the blade thus positioned, the gates are set to their lower limit positions at step 308. It should be noted that the lower (and upper) gate and blade positions may be imposed by physical limits of the turbine unit, such as at a fully closed gate position or at the end of stroke of an actuator, or may be imposed by operational criteria, such as maximum axial shaft thrust, or a threshold point beyond which the gates may become irretrievably lodged due to water impingement forces.

With the gates and blades thus positioned, circuit 82 proceeds to step 310, where sensed parameter signals are accessed (preferably following a waiting period as described above). At step 312, statistical analyses are performed on the parameter signals as described above with respect to step 222, and at step 314 comparisons of the statistical data (e.g. mean and standard deviation for flow, head and power generation level) are compared to acceptability bands to determine whether the system has reached steady state operation. If not, circuit 82 returns to step 308 to await steady state conditions. When the unit has reached steady state operation, the gate position is incremented at step 316. A check is made at step 318 to determine whether the gate upper limit position has been reached and, if not, the search proceeds by acquiring test data for the new test setting by returning to step 310. Once the upper limit gate setting is reached at step 318, circuit 82 proceeds to step 320 to determine flow characteristic data through use of a linear regression fit analysis in a manner well known in the art. The resulting flow characteristic data is stored at step 322, and circuit 82 proceeds to step 324 to determine flow characteristic data for the blade upper limit position.

The steps for determining the blade upper limit position flow characteristic data are generally analogous to the steps outlined above for the blade lower limit position test sequence. At step 324, circuit 82 accesses existing blade upper limit flow characteristic data for the current set of operating parameter levels if such data is stored in memory circuit 78. If the data has been determined from a previous search, circuit 82 proceeds to step 344, returning to the optimization search routine. If not, the runner blades are set to their upper limit position at step 326, and the gates are set to their lower limit positions at step 328. Preferably following a settling period, parameter signals are accessed at step 330 and statistical analyses are performed on their values at step 332. If it is determined that the unit has reached steady state operation at step 334, the gate position is incremented at step 336 to a subsequent test position. If steady state operation has not been reached at step 334, circuit 82 returns to step 330 to again cycle through the settling period and statistical analysis steps. At step 338, a check is performed to determine whether the gate upper limit has been reached and, if not, the routine proceeds to obtain flow information for the new test position. Once the gate upper limit position is reached, the routine proceeds to step 340 where flow characteristic data is calculated for the blade upper limit test points by linear regression curve fitting. The resulting data is stored at step 342. As mentioned above, the test data for the gate and blade settings serves as the basis for defining candidate positions of the gates and blades resulting in substantially constant flow, as set forth in U.S. Pat. No. 5,402,332 and discussed above. At step 344, the routine returns to the optimization search routine at step 212. It should be noted that in the presently preferred embodiment, the desired flow characteristic data is determined from tests at the upper and lower blade positions and at three gate positions, including the upper and lower limit positions and one intermediate position. However, it should be understood that test data could be collected for additional intermediate positions where deemed appropriate.

Figure 4D:
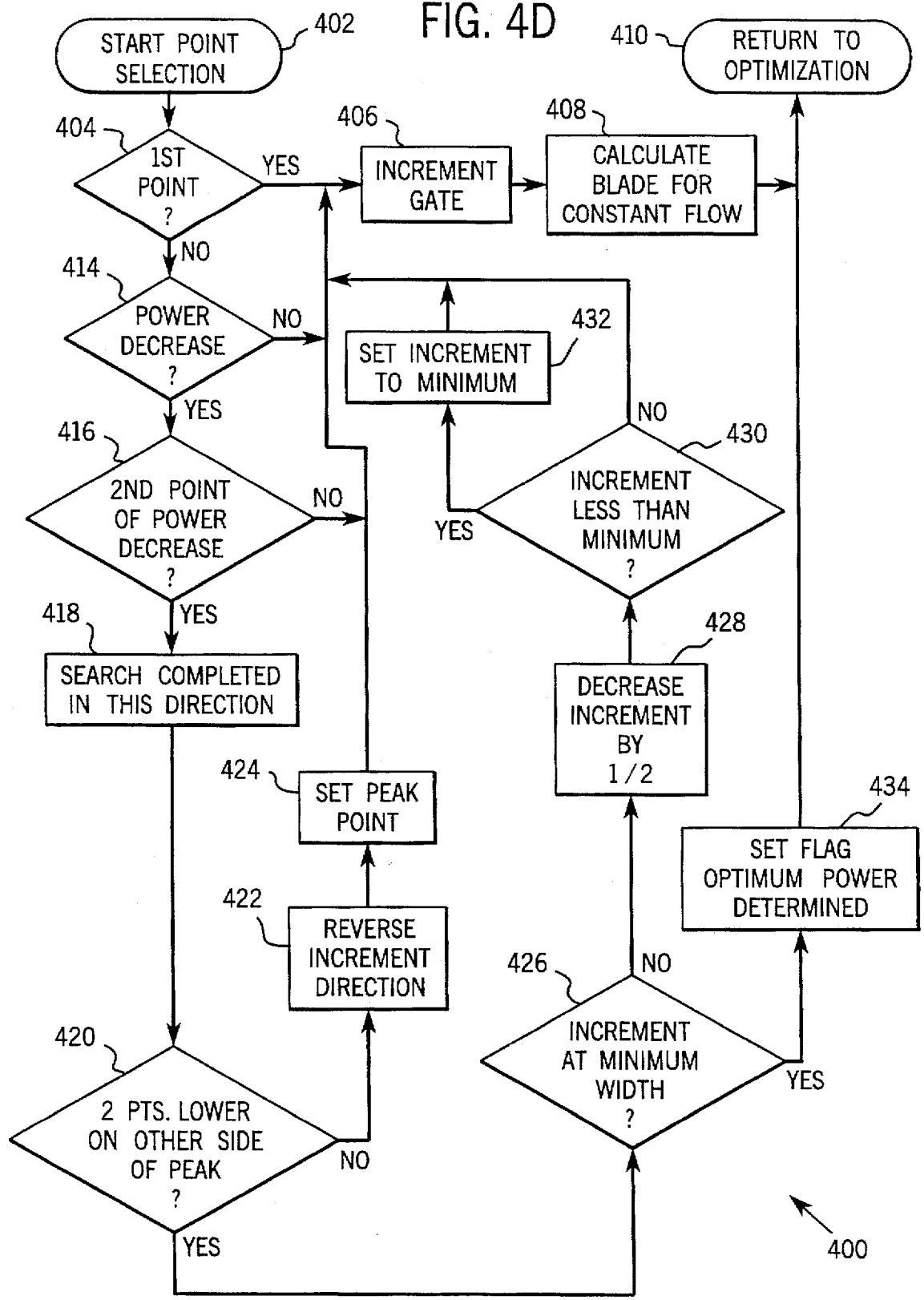

As summarized above, the preferred optimization search sequence proceeds through a series of candidate gate and blade positional settings to identify the those settings resulting in the maximum power output for the N-dimensional set of operating parameters for which the virtual cam matrix is to be populated. FIG. 4D illustrates exemplary control logic for identifying candidate gate and blade positions and for determining whether optimal settings have been identified.

As shown in FIG. 4D, set point selection routine 400 begins at step 402. At step 404, circuit 82 determines whether the candidate settings most recently tested in search routine 200 were the first candidate settings. If so, no comparison data is yet available and the routine proceeds to step 406, where the gate setting is incremented. In the presently preferred embodiment, routine 200 begins with a fixed increment amount, such as 10% of the gate positional range. Based upon the new gate setting, a corresponding candidate blade position is determined at step 408 by reference to the constant flow characteristic curve for the set of operating conditions, as determined from routine 300 described above. Circuit 82 then proceeds to step 410, returning to step 230 of the optimization routine.

If at step 404 it is determined that the most recent candidate settings tested are not the first points tested, the routine proceeds to step 414 where the power output level resulting from the most recent candidate settings is compared with power output levels resulting from previous candidate settings (typically the penultimate candidate settings) to determine whether the power output level has decreased. If power output has risen from the level produced from previous settings, the search proceeds to step 406 and new gate and blade candidate settings are determined, effectively continuing the search in the direction of candidate settings resulting in greater power output levels. If at step 414 it is determined that the power output level from the most recent candidate settings has decreased from the previous level, the routine advances to step 416, where the previous two output levels are examined to determine whether the decreased output level is the second consecutive decrease. If not, the routine again returns to step 406 to generate and test an additional set of candidate settings in the same direction of increment. If the decrease in output level is the second consecutive decrease at step 416, the routine proceeds to step 418, indicating that the search is complete in the present direction of increment. It should be noted that steps 414, 416 and 418 permit the search to continue although a single power decrease is encountered, effectively requiring two consecutive declining power output signals before reversing the direction of the search.

Once circuit 82 determines that the most recent direction of searching is not likely to locate better candidate gate and blade settings than already found, at step 420 it examines previous test points to determine whether the direction of search has already been reversed (i.e. at least two declining power output levels have resulted from settings on an opposite side of the maximum power output level thus far attained). If the result of this inquiry is negative, indicating that settings resulting in optimum power output may lie on the opposite side of the best settings thus far identified, the increment direction is reversed at step 422. At step 424, the settings are set back to the best previously identified settings, and the routine continues to step 406 to identify the next candidate settings in the new search direction.

In the presently preferred embodiment, the candidate point selection routine, after identifying gate and blade settings on either side of an optimal point, proceeds through at least an additional series of tests using a finer increment size, to provide greater resolution in identifying the optimal gate and blade settings. Thus, if at step 420 it is determined that two successive declining power output levels have been found on both directions of incremental searching, the gate increment step is reduced at steps 426, 428, 430 and 434. At step 426, circuit 82 compares the most recent increment step size to a minimum allowable step size (such as 0.5%) to determine whether the search resolution has reached its finest level. If the result of the comparison is negative, the increment size is reduced by ½ at step 428 and the new step size is again compared to the minimum increment size at step 430. If the reduction has resulted in an increment size less than the minimum allowable size, the increment step size is set to the minimum at step 432 and the routine proceeds to step 406 to continue to test candidate settings on either side of the current best settings using the new increment size. If at step 430 the new increment size is not less than the minimum allowable size, the routine similarly returns to step 406 to identify the optimal settings based on the new increment size. Ultimately, when the successively finer increment sizes have reached the minimum allowable increment size and the optimal settings are identified with the correspondingly greatest resolution, the optimum flag is set at step 434 as described above, ending the optimization search.

It should be noted that the foregoing optimization technique ultimately results in population of an optimal matrix for the N-dimensional virtual cam that is subsequently referred to by the controller for setting the gate and blade positions each time the set of monitored operating parameters corresponds to the optimized matrix location. Because a particular set of operating parameters may not be encountered for a considerable time period, certain uncommon combinations of operating conditions being encountered only seasonally, yearly or during highly unusual periods (e.g. due to high rain fall amounts, runoff or the like), the matrix may not become fully populated or may take a considerable time to populate. However, once a new set of operating conditions is encountered, the optimization technique will identify the need to perform the search and proceed to identify the best settings for the new conditions. In addition, it should be noted that the optimal matrix need not include all of the additional parameters outlined above. Depending upon the particular needs and situation of a given installation, instrumentation and software for generating the optimal matrix may be added for some or all of the parameters over time. Moreover, factors other than the additional parameters identified above may be incorporated into the N-dimensional virtual cam as needed.

What is claimed is:

1. A method for optimizing performance of a Kaplan turbine power generating unit, the unit including wicket gates movable to desired positions and runner blades movable to desired tilt positions, the runner blades being coupled through a drive shaft to an electrical power generator, the method comprising the steps of:

(a) monitoring a set of operating parameter levels including desired power generation level, flow rate through the unit, head across the unit and at least one other operating parameter capable of affecting efficiency of the turbine unit;

(b) comparing the monitored levels to reference levels of the same parameters;

(c) based upon a predetermined relationship between the reference levels and the monitored levels, identifying whether an optimization search should be performed for gate and blade position settings for the set of operating parameter levels;

(d) when the decision in step (c) is affirmative, performing a search identifying optimal gate and blade positions for the set of operating parameter levels;

(e) storing the optimal gate and blade positions identified by the set of operating parameters in an N-dimensional optimal virtual cam matrix reference, where N is the number of operating parameters in the set of operating parameters; and (f) maintaining the gates and blades in positions identified by the matrix reference.

2. The method of claim 1, wherein the set of operating parameter levels includes at least two parameters in addition to power generation level, flow rate and head.

3. The method of claim 1, wherein the at least one other operating parameter is selected from a group consisting of the physical situation of the unit in the facility, the operating state of neighboring units in the facility, trash rack loss and a parameter representative of cavitation in the turbine.

4. The method of claim 1, wherein the optimal gate and blade positions are selected based upon gate and blade positions resulting in maximum power generation level for a desired flow rate.

5. The method of claim 1, wherein in step (e) the optimal gate and blade positions are stored in an N-dimensional optimal matrix, where N is equal to the number of operating parameters in the set of operating parameters.

6. The method of claim 5, wherein the reference levels identify locations in the optimal matrix, wherein at step (b) the comparison identifies the location of the set of operating parameters in the optimal matrix, and wherein at step (c) a decision is made to perform an optimization search when the comparison at step (b) indicates that no previous optimization search has been performed for the unit for the set of operating parameters.

7. The method of claim 1, wherein the optimization search is performed while maintaining a substantially constant flow rate through the unit.

8. The method of claim 7, wherein prior to performing the optimization search, a characteristic test is performed to identify combinations of gate and blade positions resulting in substantially constant flow rate through the unit for the set of operating parameters.

9. The method of claim 1, wherein the optimization search progresses through a plurality of candidate gate and blade positional combinations and the positional combination resulting in maximum power output for the set of operational parameters is selected as the optimal gate and blade positions.

10. The method of claim 9, wherein a settling period is interposed between testing of each candidate gate and blade positional combination, the settling period permitting the set of operational parameters to reach steady state levels.

11. The method of claim 9, wherein the optimization search progresses through the plurality of candidate gate and blade positions in at least two different increment sizes.

12. A method for optimizing performance of a Kaplan turbine power generating unit, the unit including wicket gates movable to desired positions and runner blades movable to desired tilt positions, the runner blades being coupled through a drive shaft to an electrical power generator, the method comprising the steps of:

(a) monitoring a set of operating parameter levels including desired power generation level, flow rate through the unit, head across the unit and at least one other operating parameter capable of affecting efficiency of the turbine unit;

(b) comparing the monitored levels to reference levels of the same parameters to identify a location of the set of operating parameters in an N-dimensional optimal virtual cam matrix, where N is the number of operating parameters in the set of operating parameters, locations in the matrix identifying desired gate and blade positions for the set of operating parameters; and (c) maintaining the gates and blades in positions identified by the location of the set of operating parameters in the matrix.

13. The method of claim 12, wherein the set of operating parameter levels includes at least two parameters in addition to power generation level, flow rate and head.

14. The method of claim 12, wherein the at least one other operating parameter is selected from a group consisting of the physical situation of the unit in the facility, the operating state of neighboring units in the facility, trash rack loss and a parameter representative of cavitation in the turbine.

15. The method of claim 12, comprising the further step of determining, based upon the comparison made at step (b), whether an optimization search should be performed to identify desired gate and blade positions for the set of operating parameters.

16. A method for optimizing performance of a Kaplan turbine power generating unit, the unit including wicket gates movable to desired positions and runner blades movable to desired tilt positions, the runner blades being coupled through a drive shaft to an electrical power generator, the method comprising the steps of:

(a) monitoring a set of operating parameter levels including at least desired power generation level, flow rate through the unit, and head across the unit;

(b) comparing the monitored levels to reference levels of the same parameters;

(c) based upon a predetermined relationship between the reference levels and the monitored levels, identifying whether an optimization search should be performed for optimal gate and blade position settings for the set of operating parameter levels;

(d) when the decision in step (c) is affirmative, performing a flow characteristic search to identify gate and blade positions resulting in substantially constant flow rate through the unit and performing a search identifying optimal gate and blade positions for the set of operating parameter levels, while maintaining flow rate through the unit substantially constant;

(e) storing the optimal gate and blade positions identified by the set of operating parameters in an N-dimensional optimal virtual cam matrix reference, where N is the number of operating parameters in the set of operating parameters; and (f) maintaining the gates and blades in positions identified by the matrix reference.

17. The method of claim 16, wherein the flow characteristic search includes the steps of:

(a) setting the runner blades in at least two positions;

(b) for each position of the runner blades, setting the wicket gates in a plurality of positions;

(c) allowing flow through the unit to stabilize;

(d) determining the flow rate resulting from the blade and gate positions; and (e) determining blade and gate positions resulting in a substantially constant flow rate through the unit.

18. The method of claim 16, wherein the set of operating parameters includes at least one operating parameter selected from a group consisting of the physical situation of the unit in the facility, the operating state of neighboring units in the facility, trash rack loss and a parameter representative of cavitation in the turbine.

19. The method of claim 16, wherein the optimal gate and blade positions are selected based upon gate and blade positions resulting in a maximum power output for the set of operating parameters.

20. A method for optimizing performance of a Kaplan turbine power generating unit, the unit including wicket gates movable to desired positions and runner blades movable to desired tilt positions, the runner blades being coupled through a drive shaft to an electrical power generator, the method comprising the steps of:

(a) monitoring a set of operating parameter levels including at least desired power generation level, flow rate through the unit, and head across the unit;

(b) comparing the monitored levels to reference levels of the same parameters;

(c) based upon a predetermined relationship between the reference levels and the monitored levels, identifying whether an optimization search should be performed for optimal gate and blade position settings for the set of operating parameter levels;

(d) when the decision in step (c) is affirmative, performing a flow characteristic search, the flow characteristic search including the steps of monitoring a parameter indicative of flow rate and varying gate and blade positions to identify the influence of gate and blade positions on the parameter indicative of flow rate;

(e) performing a search identifying optimal gate and blade positions for the set of operating parameter levels, while maintaining flow rate through the unit substantially constant based upon results of the flow characteristic search of step (d);

(f) storing the optimal gate and blade positions identified by the set of operating parameters in an N-dimensional optimal virtual cam matrix reference, where N is the number of operating parameters in the set of operating parameters; and (g) maintaining the gates and blades in positions identified by the matrix reference.

21. The method of claim 20, wherein the parameter indicative of flow rate is differential pressure.

22. The method of claim 20, wherein the set of operating parameters includes at least one operating parameter selected from a group consisting of the physical situation of the unit in the facility, the operating state of neighboring units in the facility, trash rack loss and a parameter representative of cavitation in the turbine.

23. The method of claim 20, wherein the optimal gate and blade positions are selected based upon gate and blade positions resulting in a maximum power output for the set of operating parameters.

24. A system for optimizing performance of a Kaplan turbine power generating installation including wicket gates movable to desired positions and runner blades movable to desired tilt positions, the runner blades being coupled through a drive shaft to an electrical power generator, the system comprising:

sensors disposed in the installation for detecting a set of operating parameters including power generation level, flow rate through the unit, head across the unit and at least one other operating parameter capable of affecting efficiency of the turbine unit, the sensors generating sensed parameter signals representative of the operating parameters;

a memory circuit storing reference levels of the operating parameters;

a comparison circuit coupled to the sensors and to the memory circuit, the comparison circuit comparing the sensed parameter signals to the reference levels; and an optimization circuit coupled to the comparison circuit and to the memory circuit, the optimization circuit executing an optimization search based upon a predetermined relationship between the sensed parameter signals and the reference levels to identify optimal gate and blade positions for the sensed operating parameters and updating the reference levels stored in the memory circuit with the identified optimal gate and blade positions;

wherein the memory circuit stores an N-dimensional virtual optimal cam matrix reference, where N is the number of operating parameters in the set of operating parameters.

25. The system of claim 24, wherein the at least one other operating parameter is selected from a group consisting of the physical situation of the installation in a power generating facility, the operating state of neighboring turbine installations in the facility, trash rack loss and a parameter representative of cavitation in the turbine.

26. The system of claim 24, wherein the operating parameters include at least two operating parameters in addition to power generation level, flow rate and head.

27. The system of claim 26, wherein the at least two operating parameters are selected from a group consisting of the physical situation of the installation in a power generating facility, the operating state of neighboring turbine installations in the facility, trash rack loss and a parameter representative of cavitation in the turbine.

28. The system of claim 24, wherein the comparison circuit and the optimization circuit are included in a programmed microprocessor.

29. The system of claim 24, wherein N is at least equal to 4.

* * * * *